United States Patent [19]
Chung

[11] Patent Number: 5,280,958
[45] Date of Patent: Jan. 25, 1994

[54] AUTOMATIC SEAT BELT FOR A VEHICLE

[76] Inventor: Tae K. Chung, 4/3-9 Youngo-Ri, Jichun-Myun, Chilgok-Kun, Gyungbuck, Rep. of Korea

[21] Appl. No.: 991,398

[22] Filed: Dec. 16, 1992

[51] Int. Cl.$^5$ .............................................. B60R 22/06
[52] U.S. Cl. ................................... 280/804; 297/469
[58] Field of Search ................. 280/804, 802; 297/469

[56] References Cited

U.S. PATENT DOCUMENTS

| | | |
|---|---|---|
| 4,223,914 | 9/1980 | Usami et al. . |
| 4,508,362 | 4/1985 | Higuchi . |
| 4,750,758 | 6/1988 | Yamamoto et al. ................. 280/804 |
| 4,776,611 | 10/1988 | Tamura et al. ...................... 280/804 |
| 4,898,402 | 2/1990 | Igarashi et al. . |
| 5,002,150 | 3/1991 | Willis . |

Primary Examiner—Karin L. Tyson
Attorney, Agent, or Firm—Birch, Stewart, Kolasch & Birch

[57] ABSTRACT

An automatic seat belt device for motor vehicles includes a retracting member for slidably moving in a C-shaped channel, a webbing connected to the retracting member at one end thereof, and a two-way motor for rotating a capstan pulley in the counter-clockwise or clockwise direction so as to move forward or return the retracting member within the channel, whereby the webbing can be effectively fitted to or easily released from the occupant seated within the vehicle as the two-way motor rotates in two directions.

4 Claims, 4 Drawing Sheets

AUTOMATIC SEAT BELT FOR A VEHICLE

BACKGROUND OF THE INVENTION

1. Field of the Invention

The present invention relates to an automatic seat belt assembly for vehicles and more particularly, a seat belt system for a motor vehicle, which includes a webbing for restraining an occupant, which is retracted up by a retracting member installed on one side of a vehicle seat so that the webbing can be effectively fitted to or easily released from the occupant seated on the vehicle seat as a two-way motor rotates in the counter clockwise or clockwise direction.

2. Description of the Related Art

Various types of automatic seat belt devices are well known in the art. Such seat belt devices include one end of webbing for restraining an occupant, which is wound up by a retractor installed on a body frame or a door so that the webbing can be fitted to or released from the seated occupant as the vehicle door is closed or opened.

Such conventional seat belt devices installed on a body frame are shown, for example, in U.S. Pat. No. 4,898,402 and U.S. Pat. No. 5,002,150. Also, such conventional seat belt devices installed on a vehicle door are shown, for example, in U.S. Pat. No. 4,223,914 and U.S. Pat. No. 4,508,362. However, these conventional seat belt devices cannot tightly, comfortably, and completely fit the seated occupant as the vehicle door is closed. Furthermore, these conventional seat belt devices are complicated in construction and expensive to manufacture.

In order to avoid such problems, the present inventor is also prosecuting U.S. patent application Ser. No. 07/743,030, filed Aug. 9, 1991, now U.S. Pat. No. 5,183,290 which disclosed an automatic seat belt device for a motor vehicle, including a retracting member installed on a vehicle door, and upper and lower webbings wherein each lower end thereof is unified into a composite structure for slidably locking with a seat belt lock and each upper end thereof is movably connected to the retracting member, whereby the upper and lower webbings can be fitted to or released from the seated occupant as the vehicle door is closed or opened. However, this automatic seat belt device for motor vehicles is slightly complicated to install on the motor vehicles.

SUMMARY OF THE INVENTION

According, it is an object of the present invention to provide an automatic seat belt device for motor vehicles which eliminates the above problems encountered with conventional automatic seat belt devices.

Another object of the present invention is to provide a seat belt assembly for motor vehicles, which includes a webbing for restraining an occupant, which is retracted up by a retracting member installed on one side of a vehicle seat so that the webbing can be effectively fitted to or easily released from the seated occupant as a two-way motor rotates in the counter-clockwise or clockwise direction.

A further object of the present invention is to provide an automatic seat belt device for motor vehicles, which is simple to install, inexpensive to manufacture, and durable in operation.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an automatic seat belt device for motor vehicles, including a retracting member slidably movable in a C-shaped channel, a webbing connected to the retracting member at one end thereof, and a two-way motor for rotating a capstan pulley in the counter-clockwise or clockwise direction so as to move forward or return beck the retracting member within the channel, whereby the webbing can be effectively fitted to or easily released from the occupant seated within the vehicle as the two-way motor rotates in two directions.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
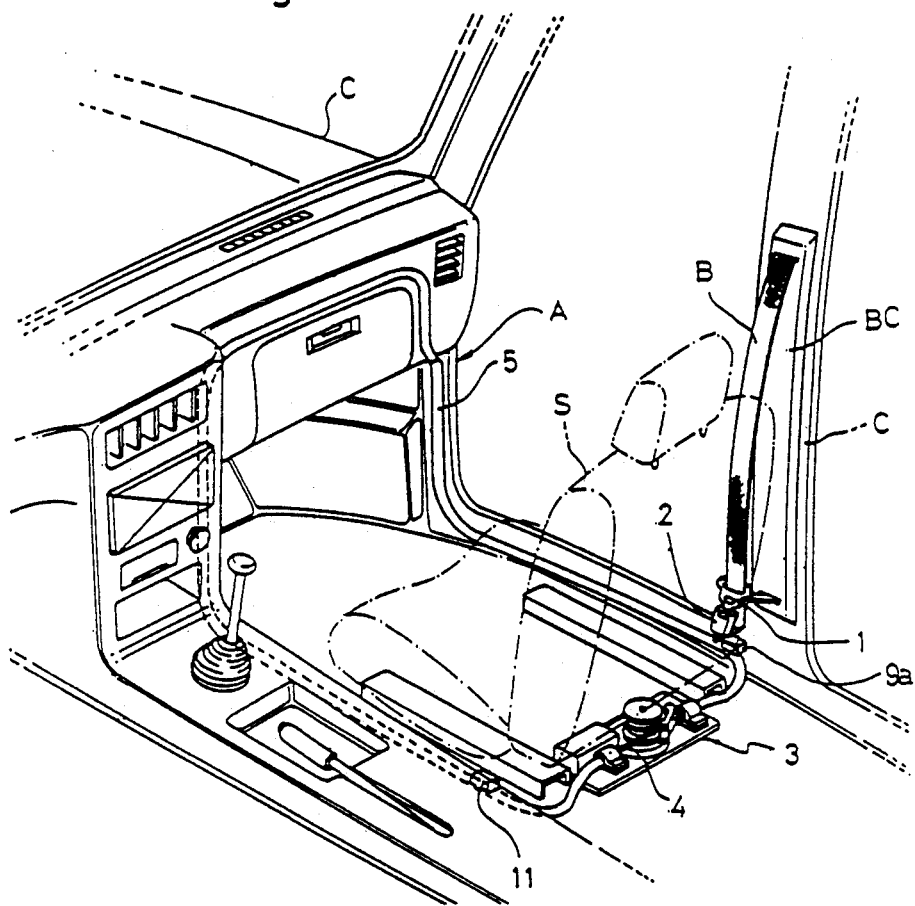
FIG. 1 is a perspective view of the automatic seat belt assembly according to the present invention.

Referring now in detail to the drawings for the purpose of illustrating preferred embodiments of the present invention, the automatic seat belt assembly A for a motor vehicle C having at least one vehicle door, one vehicle seat, and one seat belt lock as shown in FIGS. 1, 2, 3 and 6 comprises a buckle tongue receiving set 2 connected to a seat belt B through a buckle 1, a wire 4 disposed within a channel 5 and connected to the buckle tongue receiving set 2, and a capstan pulley 33 wound with the wire 4, which can be rotated by a two-way motor 32.

The seat belt B disposed within a seat belt casing BC can be restrictively released from the seat belt casing in a conventional manner. The buckle tongue receiving set 2 is attached to the wire 4 by a fixed pin 7 as a fixing pin 50 is inserted into apertures of one side extension 2a, a heading 7a of the fixed pin 7 and the other side extension 2a. An extended middle portion of the fixed pin can be covered with an anti-abrasion sleeve 8 for protecting it from abrading by a hook 16 of a retracting member 13.

Figure 2:
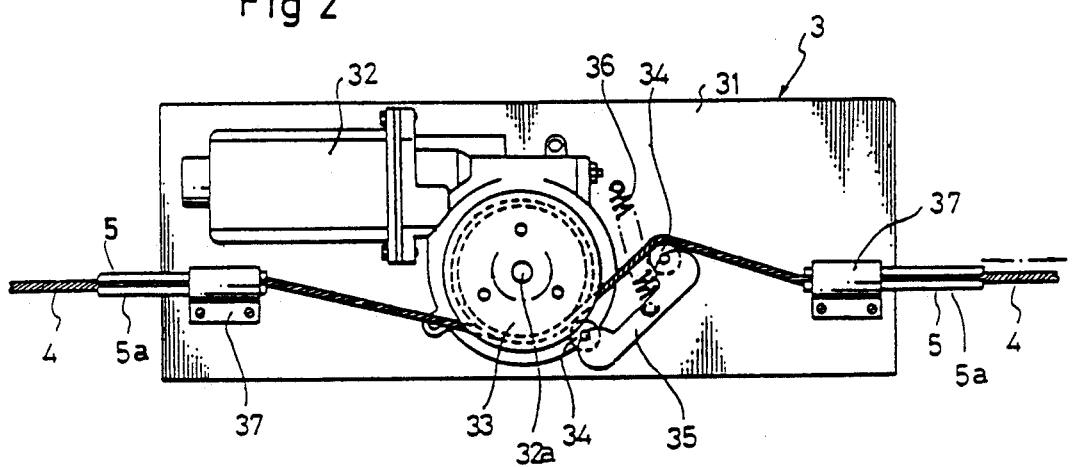
FIG. 2 is a top plan view of a capstan pulley connected to a two-way motor according to the present invention.

As shown in FIG. 2, the capstan pulley 33 is supported on a base plate 31 of a rotating member 3 which is located under the seat S, and is operatively connected to the two-way motor 32 mounted thereon. The two-way motor 32 and the capstan pulley 33 have a common axle 32a. The capstan pulley 33 wound with wire 4 is provided with a pair of guide rollers 34 with guide means respectively, and a wire tension controller 35 which is connected by a spring 36 so as to maintain tension on the wire 4. Also, the wire 4 on either side of the capstan pulley 33 can be retained by a pair of tubes 37 fixed to the base plate 31.

Figure 3:
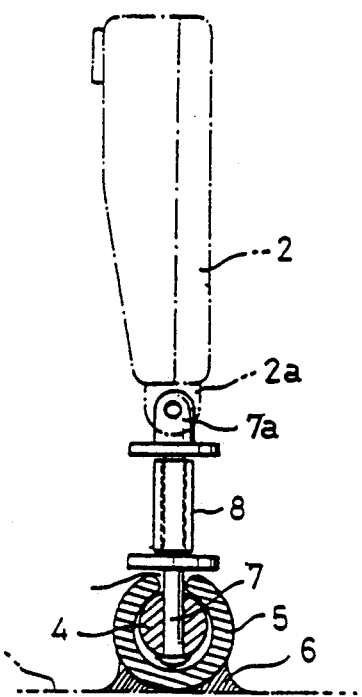
FIG. 3 is an enlarged perspective view of a wire disposed within a channel of the automatic seat belt assembly containing cut-away portions in order to illustrate the construction of the assembly of the present invention.

The channel 5 having the opening 5a disposed on the top thereof has a C-shaped configuration, and is attached on the interior of the motor vehicle C and surrounds the seat S (FIGS. 1 and 3). The wire 4 is rolled around the capstan pulley 33 for bi-directional movement therearound.

Figure 4:
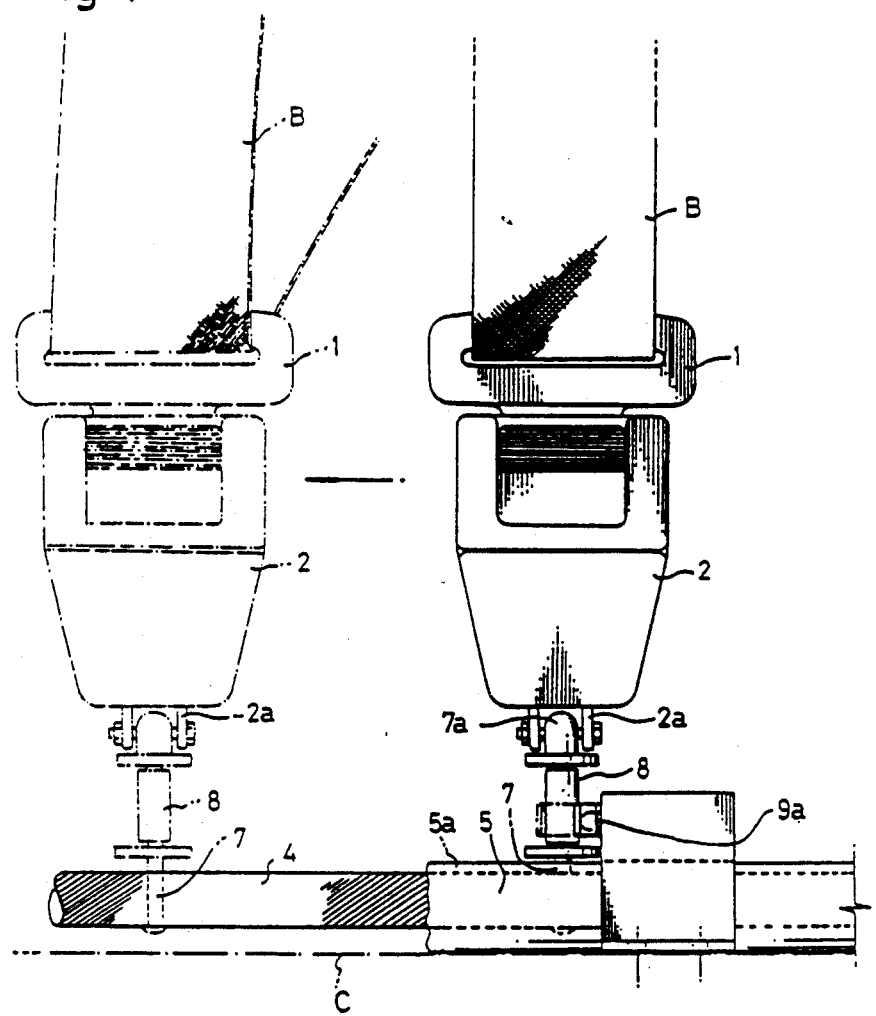
FIG. 4 is a front elevational view of the wire connected to the automatic seat belt showing the operation of the seat belt according to the present invention.

As shown in FIG. 4, when the sleeve 8 is operatively contacted with a first limit switch 9a, the two-way motor 32 does not operate.

Figure 5A:
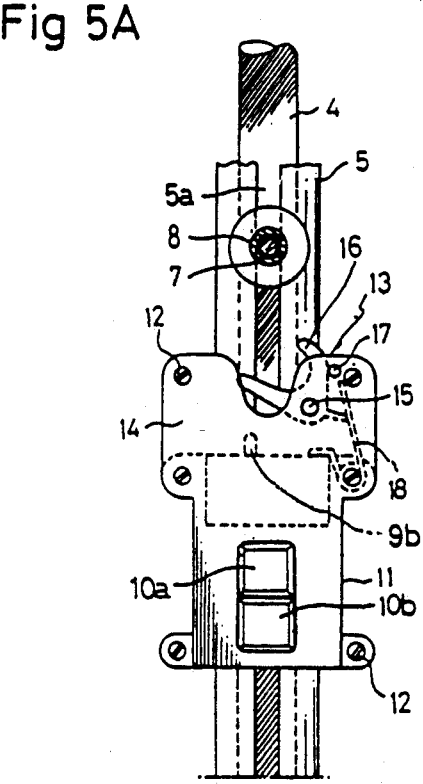
FIGS. 5A and 5B are top plan views of a retracting member of the automatic seat belt assembly showing the operation of a locking member connected to the retracting member of the automatic seat belt assembly according to the present invention in a released position or in a locked position.
Figure 5B:
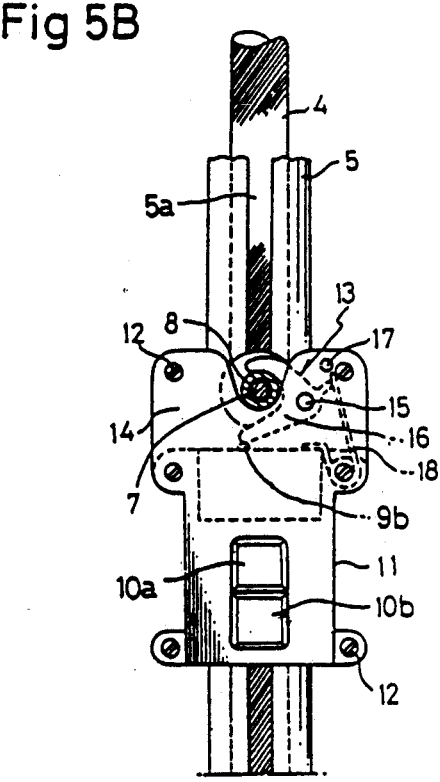
Figure 6:
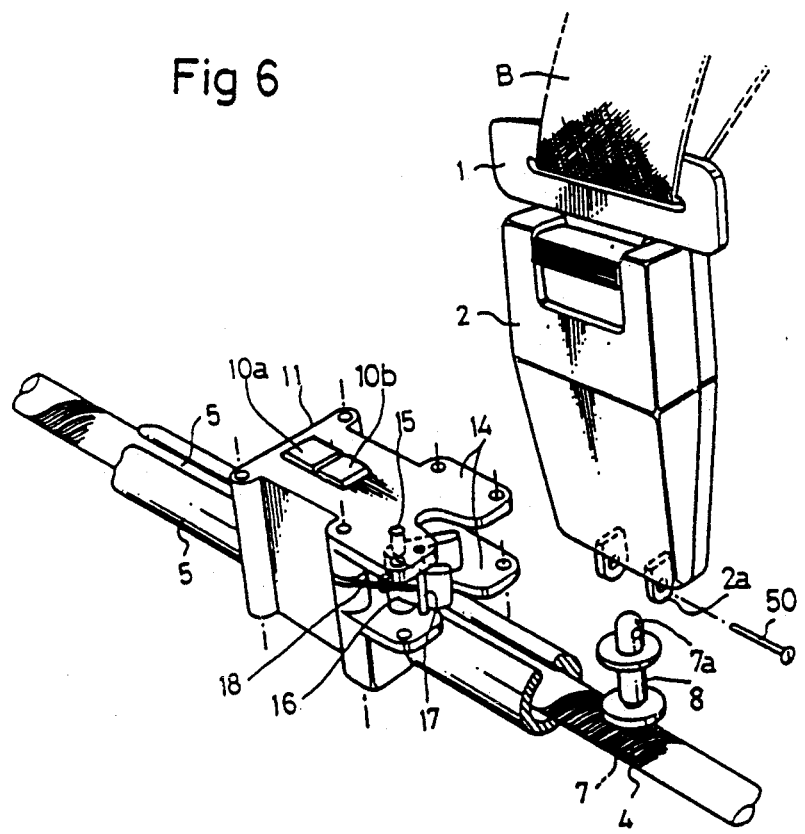
FIG. 6 is a perspective view of the moving member attached to the wire to be locked with the retracting member of the automatic seat belt assembly according to the present invention.

The two-way motor 32 is actuated by a first start button 10a and a second start button 10b disposed on a button housing 11 and in addition, the first and second start buttons 10a and 10b function to make the capstan pulley 33 rotate in the counter-clockwise and clockwise directions when the start buttons 10a and 10b are pushed. (FIGS. 5A, 5B and 6). A second limit switch button 9b is provided within the button housing 11. The button housing 11 is fixed to the interior of the motor vehicle C by a plurality of screws 12 and a pair of extension plates 14 for containing a U-shaped hook 16 of the retracting member 13. The hook 16 is pivotally attached to the pair of plates 14 by a pivot pin 15. Accordingly, the retracting member 13 includes the hook 16, a stopper 17 for stopping the hook 16 and a resilient spring 18.

As shown in FIGS. 5A and 5B, upon rotating in the counter-clockwise direction by pushing the first start button 10a, the sleeve 8 of the fixed pin 7 with the belt buckle 2 moves from the first limit switch button 9a to the button housing 11 having the second limit switch button 9b (FIG. 1). Thereafter, the sleeve 8 pushes one end of hook 16 (FIG. 5A) and the other end thereof locks around the sleeve 8 and one end of the hook 16 simultaneously pushes the second limit switch button 9b. Therefore, the two-way motor 32 deactivates and the sleeve 8 with the seat belt B retracts away from the seated occupant. In any motor vehicle accident, the hook 16 does not unlock since the hook 16 is biased by the resilient spring 18 and the two-way motor does not actuate and the wire 4 does not move (FIG. 5B).

Figure 7:
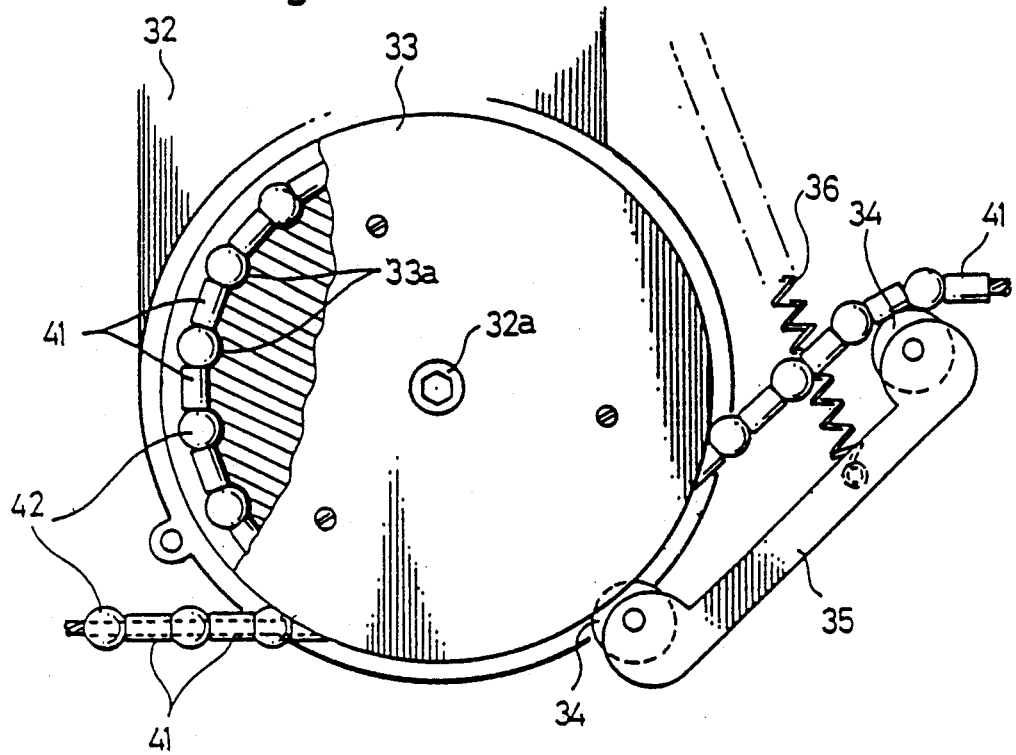
FIG. 7 is a top plan view of the capstan pulley of the retracting member of the automatic seat belt assembly containing cut-away portions in order to illustrate the construction of the assembly according to the present invention.
Figure 8:
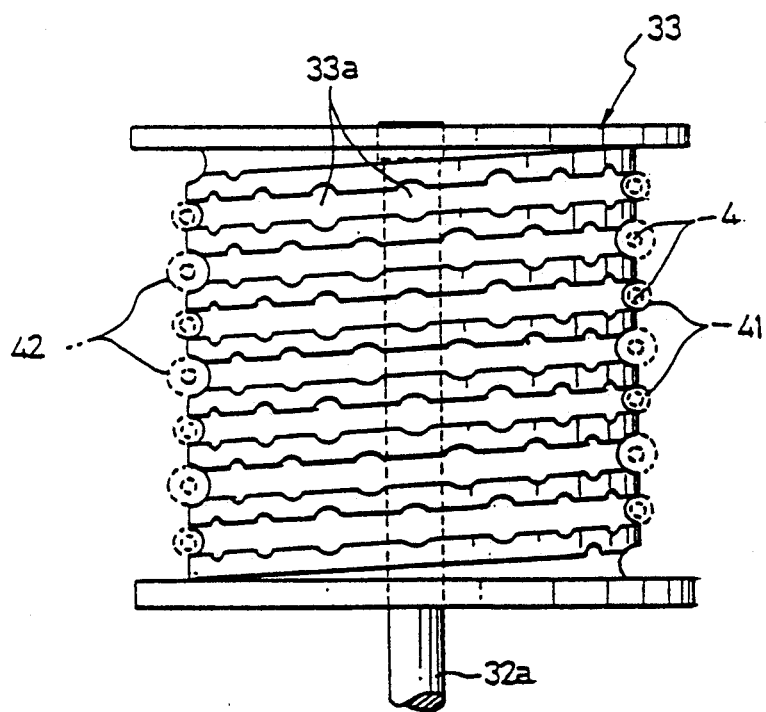
FIG. 8 is a front elevational view of the capstan pulley having a helical traction groove disposed therein of the automatic seat belt assembly according to the present invention.

As shown in FIGS. 7 and 8, the capstan pulley 33 has a spiral traction groove 33a for slidably receiving a plurality of traction balls 42 and tubes 41. The wire 4 is passed through the center of tube 41, ball 42, tube 41 and so on. Therefore, the wire 4 with the plurality of tubes 41 and balls 42 is tightly inserted into the spiral traction groove 33a so that there is no slippage and the seat belt does not release in any impact.

The automatic seat belt assembly according to the present invention operates as follows:

As shown in FIG. 1, when the first start switch button 10a is pushed, the two-way motor 32 rotates in the counter-clockwise direction. Therefore, the capstan pulley 33 rotates in the counter-clockwise direction and the sleeve 8 with the seat belt B moves forward along the C-shaped channel 5. Finally, the sleeve 8 pushes the hook 16 and the hook 16 locks against the sleeve 8 and touches the second limit switch button 9b so that the two-way motor 32 deactivates and the seat belt B is tightly fitted to the occupant of the seat.

At this time, the hook 16 is biased by the resilient spring 18 and the wire 4 with the plurality of tubes 41 and balls 42 is firmly held by the spiral traction groove 32a disposed around the outer periphery of the capstan pulley 33. According, even under a sudden or severe motor vehicle impact, the seat belt cannot be released from the occupant seated on the vehicle seat S.

In turn, when the second start switch button 10b is pushed, the two-way motor 32 rotates in the clockwise direction and the sleeve 8 with the seat belt B moves backward along the C-shaped channel 5. At this time, the hook 16 is released from the sleeve 8, and the sleeve 8 comes into contact with the first limit switch button 9a so that the two-way motor 32 inactivates to stop movement of the seat belt. Accordingly, the seat belt B is easily released from the occupant seated in the motor vehicle C.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An automatic seat belt assembly for a motor vehicle having at least one vehicle seat and one emergency release buckle, said automatic seat belt assembly comprising:

a webbing having one end thereof attached to a wire through a fixed pin and combined by a seat belt latch for locking in said emergency release buckle, said fixed pin having an extended middle portion, said middle portion having a sleeve covered thereon, said webbing having a second end thereof stored in a seat belt casing;

a capstan pulley for rolling said wire in a selected one of a counter-clockwise direction and a clockwise direction by operation of a two-way motor, said capstan pulley and two-way motor being supported on a base plate;

a C-shaped channel for slidably moving said wire forward and backward therewithin, said C-shaped channel being attached to an interior of said motor vehicle and disposed around said vehicle seat;

a first limit switch button disposed at a first end of said C-shaped channel and adjacent said emergency release buckle for enabling inactivation of said two-way motor when said sleeve contacts said first limit switch;

a retracting member disposed at a second end of said C-shaped channel and opposite said first limit switch button for selectively locking and releasing said sleeve, said retracting member including a Y-shaped hook member selectively engageable with said sleeve, a pivot pin about which said Y-shaped hook pivotally rotates, a stopper for limiting rotation of said Y-shaped hook, a resilient spring for biasing the Y-shaped hook, and first and second switch buttons for initiating rotation said two-way motor and capstan pulley in the counter-clockwise direction and in the clockwise direction, respectively, and a second limit switch button disposed in said retracting member for deactivating said two-way motor wherein said Y-shaped hook contacts therewith, whereby, when the first start switch button is pushed, the two-way motor rotates in the counter-clockwise direction, the capstan pulley rotates in the counter-clockwise direction, and the sleeve with the seat belt moves forward and locks within the Y-shaped hook of the retracting member and the two-way motor deactivates, and in turn, when the second start switch button is pushed, the two-way motor and the capstan pulley rotate in the clockwise direction, and the sleeve with the belt is released from the Y-shaped hook of the retracting member, moves into contact with the first limit switch button and the two-way motor deactivates so that the seat belt can be comfortably fitted to and easily released from the occupant seated in the motor vehicle.

2. The automatic seat belt assembly of claim 1, wherein said base plate is located under said vehicle seat.

3. The automatic seat belt assembly of claim 1, wherein said C-shaped channel is attached on a dashboard at the center portion thereof.

4. The automatic seat belt assembly of claim 1, wherein said capstan pulley includes a spiral traction groove disposed on the outer peripheral surface thereof for slidably and tightly receiving said wire threaded through tube and ball members so as to prevent movement of said wire while the capstan pulley is stationary.

* * * * *